United States Patent
Kamado et al.

(10) Patent No.: US 12,116,756 B2
(45) Date of Patent: Oct. 15, 2024

(54) METHOD AND SYSTEM FOR CALIBRATING WORK MACHINE

(71) Applicant: KOMATSU LTD., Tokyo (JP)

(72) Inventors: Mitsuhiko Kamado, Tokyo (JP); Takashi Sawaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 291 days.

(21) Appl. No.: 17/779,302

(22) PCT Filed: Feb. 17, 2021

(86) PCT No.: PCT/JP2021/006001
§ 371 (c)(1),
(2) Date: May 24, 2022

(87) PCT Pub. No.: WO2021/186995
PCT Pub. Date: Sep. 23, 2021

(65) Prior Publication Data
US 2022/0389687 A1    Dec. 8, 2022

(30) Foreign Application Priority Data
Mar. 16, 2020   (JP) .................. 2020-045458

(51) Int. Cl.
*E02F 9/26*   (2006.01)
*E02F 9/22*   (2006.01)

(52) U.S. Cl.
CPC ............ *E02F 9/264* (2013.01); *E02F 9/2228* (2013.01); *E02F 9/2235* (2013.01); *E02F 9/2296* (2013.01)

(58) Field of Classification Search
None
See application file for complete search history.

(56) References Cited

U.S. PATENT DOCUMENTS

2013/0158788 A1   6/2013   Seki
2013/0158789 A1   6/2013   Seki
(Continued)

FOREIGN PATENT DOCUMENTS

CN   108691325 A   10/2018
CN   110392754 A   10/2019
(Continued)

OTHER PUBLICATIONS

The Office Action for the corresponding Chinese application No. 202180006739.1, issued on Jan. 12, 2023.
(Continued)

*Primary Examiner* — Adam D Tissot
*Assistant Examiner* — Garrett F Evans
(74) *Attorney, Agent, or Firm* — Global IP Counselors, LLP

(57) ABSTRACT

A first process acquires a true value of the position of a predetermined portion. A second process acquires a reference position of a work machine. A third process determines a plurality of correction candidate values of a parameter. The correction candidate values are used so that a calculation value of the position of the predetermined portion calculated based on the parameter from the reference position matches the true value. A fourth process calculates an assessment value indicative of the difference between the true value and a calculation value for each of plurality of correction candidate values. A fifth process determines a confirmation correction value of the parameter from among the plurality of correction candidate values based on the assessment value.

18 Claims, 8 Drawing Sheets

(56) References Cited

U.S. PATENT DOCUMENTS

| | | | |
|---|---|---|---|
| 2017/0260717 A1 | 9/2017 | Seki et al. | |
| 2018/0282977 A1* | 10/2018 | Hiromatsu | E02F 3/435 |
| 2019/0024344 A1* | 1/2019 | Okui | G01C 15/06 |
| 2019/0345697 A1 | 11/2019 | Ishihara et al. | |
| 2021/0148093 A1* | 5/2021 | Shimada | E02F 9/2228 |

FOREIGN PATENT DOCUMENTS

| | | |
|---|---|---|
| JP | 6-257180 A | 9/1994 |
| JP | 2012-202061 A | 10/2012 |
| JP | 5328830 B2 | 10/2013 |
| JP | 6068730 B2 | 1/2017 |
| JP | 2019-61502 A | 4/2019 |

OTHER PUBLICATIONS

The International Search Report for the corresponding international application No. PCT/JP2021/006001, issued on Apr. 27, 2021.

\* cited by examiner

METHOD AND SYSTEM FOR CALIBRATING WORK MACHINE

CROSS-REFERENCE TO RELATED APPLICATIONS

This application is a U.S. National stage application of International Application No. PCT/JP2021/006001, filed on Feb. 17, 2021. This U.S. National stage application claims priority under 35 U.S.C. § 119(a) to Japanese Patent Application No. 2020-045458, filed in Japan on Mar. 16, 2020, the entire contents of which are hereby incorporated herein by reference.

The present disclosure relates to a method and a system for calibrating a parameter used for calculating the position of a predetermined portion from a reference position of a work machine, in a work machine that includes the predetermined portion.

BACKGROUND INFORMATION

Conventionally, a technique is known for calculating the position of another portion from the position of a predetermined portion of a work machine. For example, a position detection device of a hydraulic excavator disclosed in Japanese Patent Laid-open No. 2012-202061 uses GPS to detect the position of a GPS antenna on a body. The position detection device uses a predetermined parameter and calculates the position of the blade tip of a bucket from the position of the GPS antenna. The predetermined parameter includes, for example, the positional relationship between the GPS antenna and a boom pin, the lengths of a boom, an arm, and the bucket, and the angles of the boom, the arm, and the bucket, etc.

SUMMARY

The accuracy of the calculated position of the blade tip of the bucket is affected by the accuracy of the afore-mentioned parameter. However, such a parameter normally has a tolerance with respect to a design value. As a result, Japanese Patent Laid-open No. 2012-202061 discloses a calibration system for automatically calibrating the parameter. The calibration system compares the position of a work point calculated by the position detection device and the position of the work point measured by an external measurement device, thereby automatically calibrating the parameter. As a result, the accuracy of the position detection can be improved. However, further improvement of the accuracy of the position detection is desired.

An object of the present disclosure is to improve the accuracy of position detection in a work machine.

A method according to an aspect of the present disclosure is executed by a computer for calibrating a parameter for a work machine. The work machine includes a predetermined portion. The parameter is used to calculate the position of the predetermined portion from a reference position of the work machine. The method comprises the following processes. A first process is acquiring a true value of the position of the predetermined portion. A second process is acquiring the reference position. A third process is determining a plurality of correction candidate values of the parameter, the correction candidate values being used so that a calculation value of the position of the predetermined portion calculated based on the parameter from the reference position, matches the true value. A fourth process is calculating an assessment value indicative of the difference between the true value and the calculation value for each of the plurality of correction candidate values. A fifth process is determining a confirmation correction value of the parameter from among the plurality of correction candidate values based on the assessment value. The order of the execution of the above processes is not limited to the above-mentioned order and may be changed.

A system according to another aspect of the present disclosure comprises a work machine, a positional sensor, and a computer. The work machine includes a predetermined portion. The positional sensor detects a reference position on the work machine. The computer calibrates a parameter to be used for calculating the position of the predetermined portion from the reference position. The computer acquires a true value of the position of the predetermined portion. The computer acquires the reference position detected by the positional sensor. The computer determines a plurality of correction candidate values of the parameter, the correction candidate values being used so that a calculation value of the position of the predetermined portion calculated based on the parameter from the reference position, matches the true value. The computer calculates an assessment value indicative of the difference between the true value and the calculation value for each of the plurality of correction candidate values. The computer determines a confirmation correction value of the parameter from among the plurality of correction candidate values based on the assessment value.

According to the present disclosure, an assessment value is calculated for the plurality of correction candidate values of the parameter, the correction candidate values being used so that the calculated value of the position of the predetermined portion of the work machine matches the true value. The confirmation correction values of the parameters are determined from the assessment value. As a result, the accuracy of the calibration of the parameter is improved. Consequently, the accuracy of position detection is improved.

DESCRIPTION OF EMBODIMENTS

Figure 1:
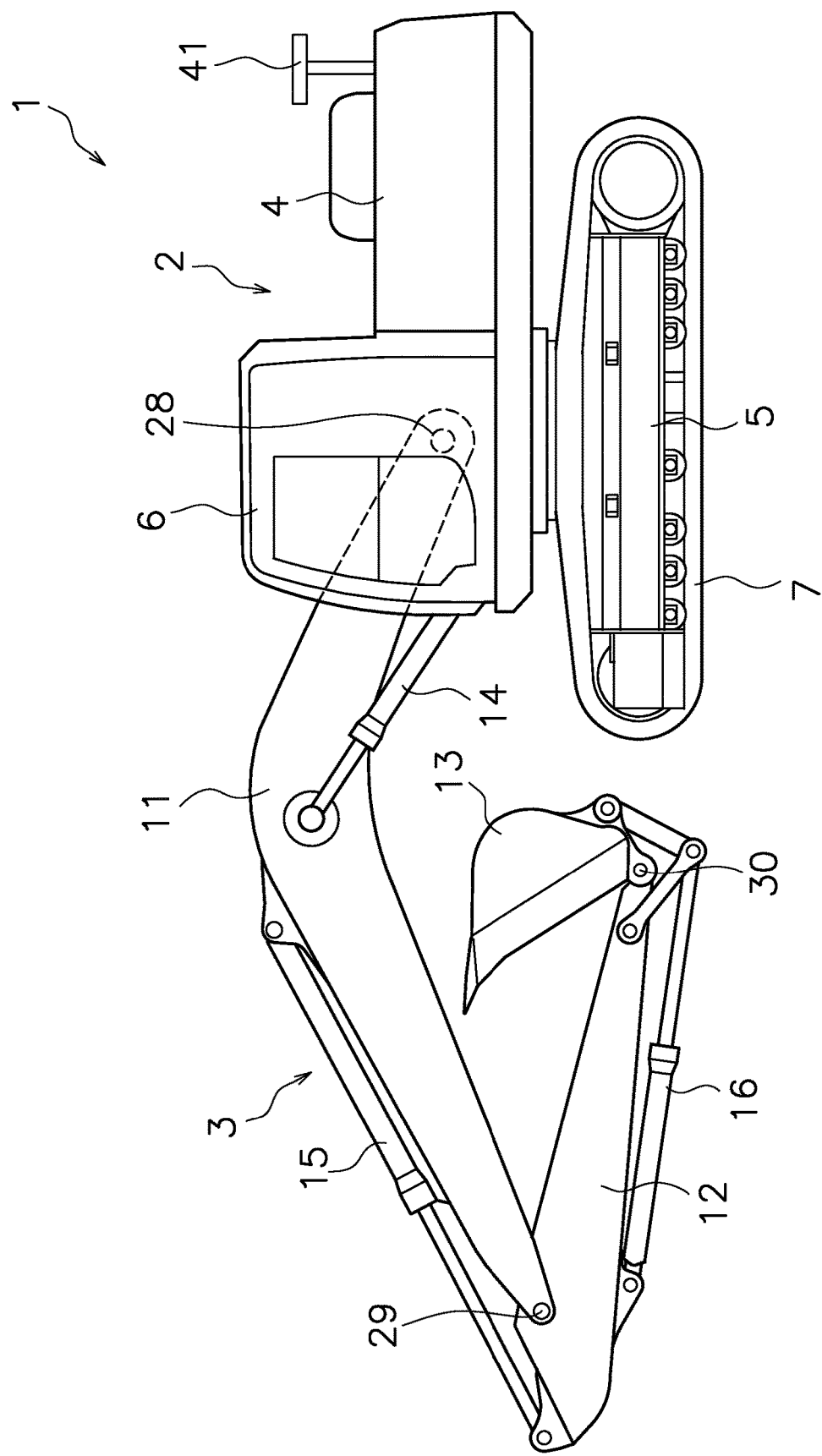
FIG. 1 is a side view of a work machine.

A control system of a work machine 1 according to an embodiment is discussed hereinbelow with reference to the drawings. FIG. 1 is a side view of the work machine 1. In the present embodiment, the work machine 1 is a hydraulic excavator.

As illustrated in FIG. 1, the work machine 1 includes a main body 2 and a work implement 3. The work implement 3 is attached to a front part of the main body 2. The main body 2 includes a rotating body 4, a traveling body 2, and a cab 6. The rotating body 4 is rotatably attached to the traveling body 2. The cab 6 is disposed on the rotating body 4. The traveling body 2 includes crawler belts 7. Only one of the left and right crawler belts 7 is illustrated in FIG. 1. The work machine 1 travels due to the crawler belts 7 being driven.

The work implement 3 includes a boom 11, an arm 12, and a bucket 13. The boom 11 is attached to the rotating body 4 so as to allow rotation around a boom pin 28. The arm 12 is attached to the boom 11 so as to allow rotation around an arm pin 29. The bucket 13 is attached to the arm 12 so as to allow rotation around a bucket pin 30.

The work implement 3 includes a boom cylinder 14, an arm cylinder 15, and a bucket cylinder 16. The boom cylinder 14, the arm cylinder 15, and the bucket cylinder 16 are, for example, hydraulic cylinders. The boom cylinder 14, the arm cylinder 15, and the bucket cylinder 16 are driven with hydraulic fluid discharged from a below-mentioned hydraulic pump 22. The boom cylinder 14 actuates the boom 11. The arm cylinder 15 actuates the arm 12. The bucket cylinder 16 actuates the bucket 13.

Figure 2:
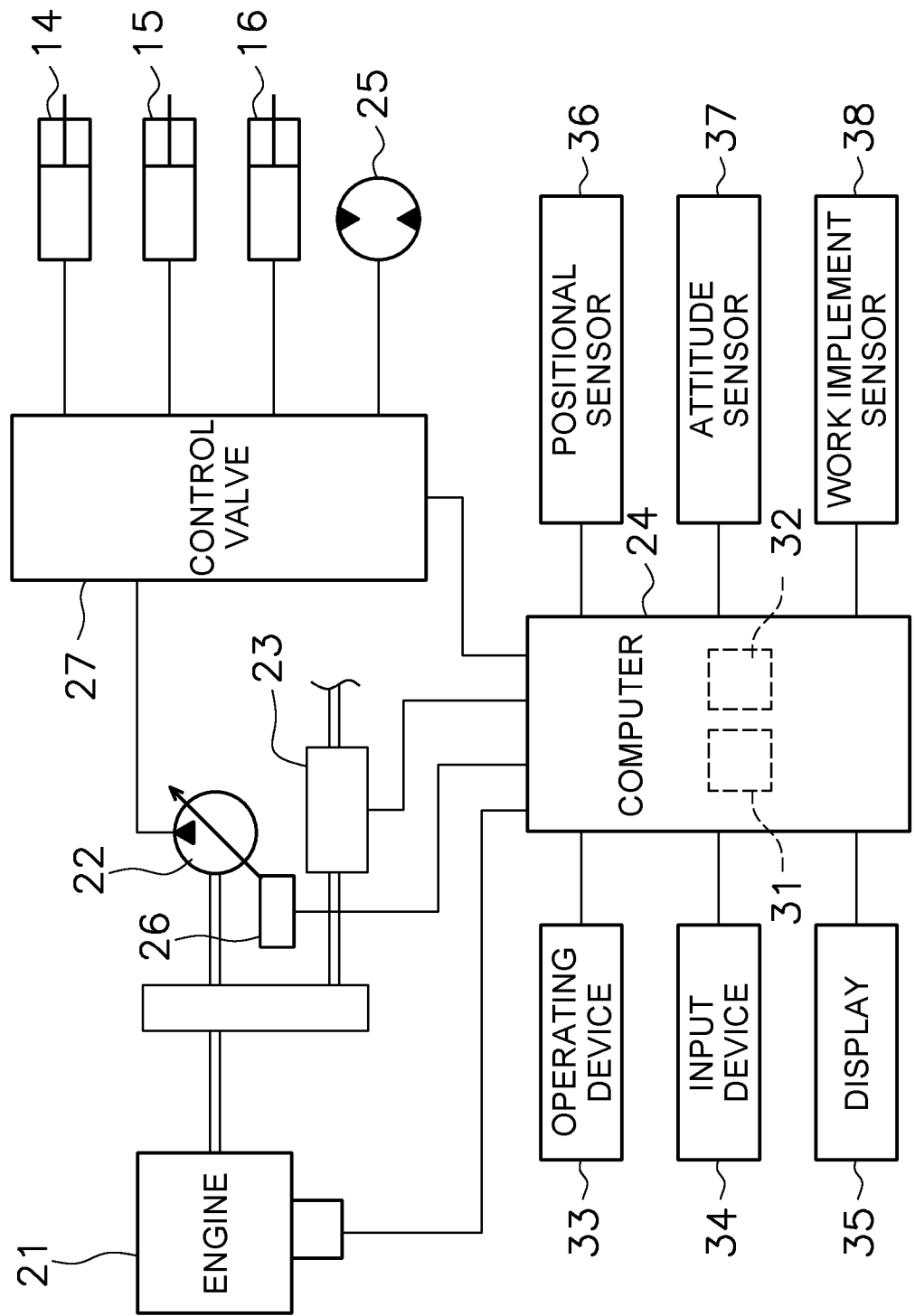
FIG. 2 is a block diagram illustrating a configuration of the work machine and a control system thereof.

FIG. 2 is a block diagram illustrating a configuration of the work machine 1 and a control system of the work machine 1. As illustrated in FIG. 2, the work machine 1 includes an engine 21, the hydraulic pump 22, a power transmission device 23, and a computer 24. The engine 21 is controlled by instruction signals from the computer 24. The hydraulic pump 22 is driven by the engine 21 to discharge the hydraulic fluid. The hydraulic fluid discharged from the hydraulic pump 22 is supplied to the boom cylinder 14, the arm cylinder 15, and the bucket cylinder 16.

The work machine 1 includes a rotation motor 25. The rotation motor 25 is, for example, a hydraulic motor. Alternatively, the rotation motor 25 may be an electric motor. The rotation motor 25 is driven by hydraulic fluid discharged from the hydraulic pump 22. The rotation motor 25 causes the rotating body 4 to rotate. While only one hydraulic pump is illustrated in FIG. 2, a plurality of hydraulic pumps may be provided.

The hydraulic pump 22 is a variable displacement pump. A pump control device 26 is connected to the hydraulic pump 22. The pump control device 26 controls the tilt angle of the hydraulic pump 22. The pump control device 26 includes, for example, an electromagnetic valve and is controlled by instruction signals from the computer 24. The computer 24 controls the displacement of the hydraulic pump 22 by controlling the pump control device 26.

The work machine 1 includes a control valve 27. The hydraulic pump 22, the cylinders 14 to 16, and the rotation motor 25 are connected to each other by means of a hydraulic circuit via the control valve 27. The control valve 27 is controlled by instruction signals from the computer 24. The control valve 27 controls the flow rate of the hydraulic fluid supplied from the hydraulic pump 22 to the cylinders 14 to 16 and to the rotation motor 25. The computer 24 controls the control valve 27 to control the motions of the work implement 3. The computer 24 controls the control valve 27 to control the rotation of the rotating body 4.

The power transmission device 23 transmits driving power from the engine 21 to the traveling body 2. The crawler belts 7 are driven by the driving power from the power transmission device 23 whereby the work machine 1 is made to travel. The power transmission device 23, for example, may be a transmission including a torque converter or a plurality of speed change gears. Alternatively, the power transmission device 23 may be a transmission of another type, such as a hydrostatic transmission (HST) or a hydraulic mechanical transmission (HMT).

The computer 24 includes a processor 31, such as a CPU. The processor 31 performs processing for controlling the work machine 1. The computer 24 includes a storage device 32. The storage device 32 includes a memory, such as a RAM or a ROM, and an auxiliary storage device, such as a hard disk drive (HDD) or a solid state drive (SSD). The storage device 32 stores data and programs for the control of the work machine 1.

The control system includes an operating device 33. The operating device 33 is operable by an operator. The operating device 33 includes, for example, a lever, a pedal, or a switch and the like. The operating device 33 outputs, to the computer, an operation signal corresponding to an operation by the operator. The computer controls the control valve so as to actuate the work implement 3 in response to an operation of the operating device 33 by the operator. The computer controls the control valve 27 so as to actuate the rotating body 4 in response to an operation of the operating device 33 by the operator. The computer 24 controls the engine 21 and the power transmission device 23 so as to cause the work machine 1 to travel in response to an operation of the operating device 33 by the operator.

The control system includes an input device 34 and a display 35. The input device 34 is operable by the operator. The input device 34 is, for example, a touchscreen. However, the input device 34 may also include hardware keys. The operator inputs various settings related to the work machine 1 by operating the input device 34. The input device 34 outputs input signals corresponding to an operation by the operator. The display 35 is an LCD, an OELD, or another type of display. The display 35 displays a screen corresponding to display signals from the computer 24.

Figure 3:
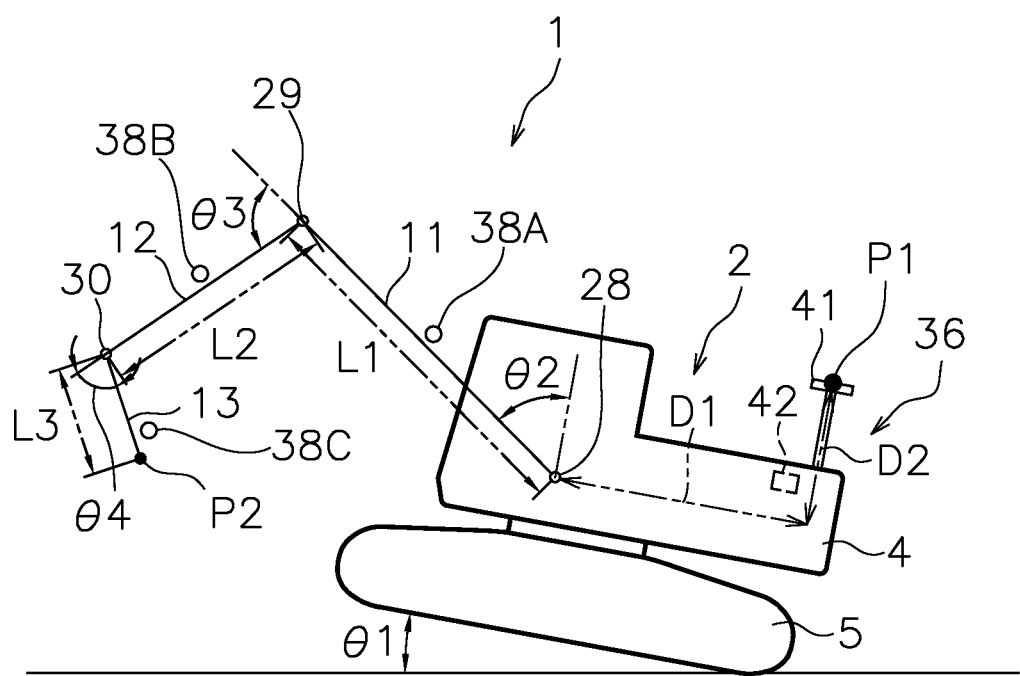
FIG. 3 illustrates parameters for calculating the position of a predetermined portion from a reference position.

The control system includes a positional sensor 36, an attitude sensor 37, and a work implement sensor 38. The positional sensor 36 detects the position of the main body 2. The position of the main body 2 is represented by an external coordinate system of the work machine 1. The external coordinate system is, for example, a global coordinate system based on a global navigation satellite system (GNSS). Alternatively, the external coordinate system may be a local coordinate system within the work site where the work machine 1 is used. As illustrated in FIG. 3, the positional sensor 36 includes an antenna 41 and a receiver 42. The antenna 41 is attached to the main body 2. The receiver 42 detects the position of the antenna 41 in the external coordinate system. The receiver 42 outputs external coordinate data indicative of the position of the antenna 41 in the external coordinate system.

The attitude sensor 37 detects the attitude of the main body 2. The attitude of the main body 2 includes the azimuth of the main body 2 and a pitch angle $\theta 1$ of the main body 2. The azimuth of the main body 2 signifies the direction in which the main body 2 is facing in the external coordinate system of the main body 2. As illustrated in FIG. 3, the pitch angle $\theta 1$ of the main body 2 is an inclination angle in the front-back direction of the main body 2 with respect to the horizontal direction. The attitude sensor 37 includes, for example, an inertial measurement unit (IMU). The attitude sensor 37 outputs first attitude data indicative of the attitude of the main body 2.

The work implement sensor 38 detects the attitude of the work implement 3. The attitude of the work implement 3 includes a boom angle $\theta 2$, an arm angle $\theta 3$, and a bucket angle $\theta 4$. The work implement sensor 38 outputs second attitude data indicative of the boom angle $\theta 2$, the arm angle $\theta 3$, and the bucket angle $\theta 4$. The boom angle $\theta 2$ is the angle of the boom 11 with respect to the vertical direction of the main body 2. The arm angle θ3 is the angle of the arm 12 with respect to the boom 11. The bucket angle θ4 is the angle of the bucket 13 with respect to the arm 12. Specifically, the work implement sensor 38 includes a boom angle sensor 38A, an arm angle sensor 38B, and a bucket angle sensor 38C as illustrated in FIG. 3. The boom angle sensor 38A detects the boom angle θ2. The arm angle sensor 38B detects the arm angle θ3. The bucket angle sensor 38C detects the bucket angle θ4.

Specifically, the boom angle sensor 38A detects the stroke length of the boom cylinder 14. The arm angle sensor 38B detects the stroke length of the arm cylinder 15. The bucket angle sensor 38C detects the stroke length of the bucket cylinder 16. The respective rotation angles of the boom 11, the arm 12, and the bucket 13 are calculated from the stroke lengths of the cylinders 14 to 16. Alternatively, the boom angle sensor 38A, the arm angle sensor 38B, and the bucket angle sensor 38C may be sensors that directly detect the respective rotation angles of the boom 11, the arm 12, and the bucket 13.

The computer 24 receives the operation signals from the operating device 33. The computer 24 receives the input signals from the input device 34. The computer 24 outputs the display signals to the display 35. The computer 24 receives the external coordinate data from the positional sensor 36. The computer 24 receives the first attitude data from the attitude sensor 37. The computer 24 receives the second attitude data from the work implement sensor 38.

The computer 24 calculates the position of the predetermined portion of the work implement 3 from a reference position P1 of the main body 2 based on the received data. In the present embodiment, the reference position P1 is the position of the antenna 41. The predetermined portion P2 is the blade tip of the bucket 13.

The storage device 32 stores first dimension data and second dimension data. The first dimension data represents the relative position of the antenna 41 with respect to the boom pin 28 on the main body 2. As illustrated in FIG. 3, the first dimension data includes a distance D1 between the reference position P1 (antenna 41) and the boom pin 28 in the front-back direction of the main body 2, and a distance D2 between the reference position P1 (antenna 41) and the boom pin 28 in the up-down direction of the main body 2.

The second dimension data includes a length L1 of the boom 11, a length L2 of the arm 12, and a length L3 of the bucket 13. Specifically, the length L1 of the boom 11 is the distance between the boom pin 28 and the arm pin 29. The length L2 of the arm 12 is the distance between the arm pin 29 and the bucket pin 30. The length L3 of the bucket 13 is the distance between the bucket pin 30 and the predetermined portion P2 (blade tip of the bucket 13).

The computer 24 calculates the position of the predetermined portion P2 in the external coordinate system from the reference position P1 based on first position data and second position data. The first position data represents the reference position P1 of the main body 2. The first position data includes the above-mentioned first dimension data and the first attitude data. The second position data represents the position of the predetermined portion P2 in the work implement 3. The second position data includes the above-mentioned second dimension data and the second attitude data.

For example, the computer 24 calculates the positional relationship of the reference position P1 and the predetermined portion P2 in the coordinate system of the main body 2 based on the first position data and second position data. The computer 24 then converts the position of the predetermined portion P2 in the coordinate system of the main body 2 to the position of the predetermined portion P2 in the external coordinate system from the positional relationship of the reference position P1 and the predetermined portion P2 in the coordinate system of the main body 2 and from the reference position P1 in the external coordinate system.

Figure 4:
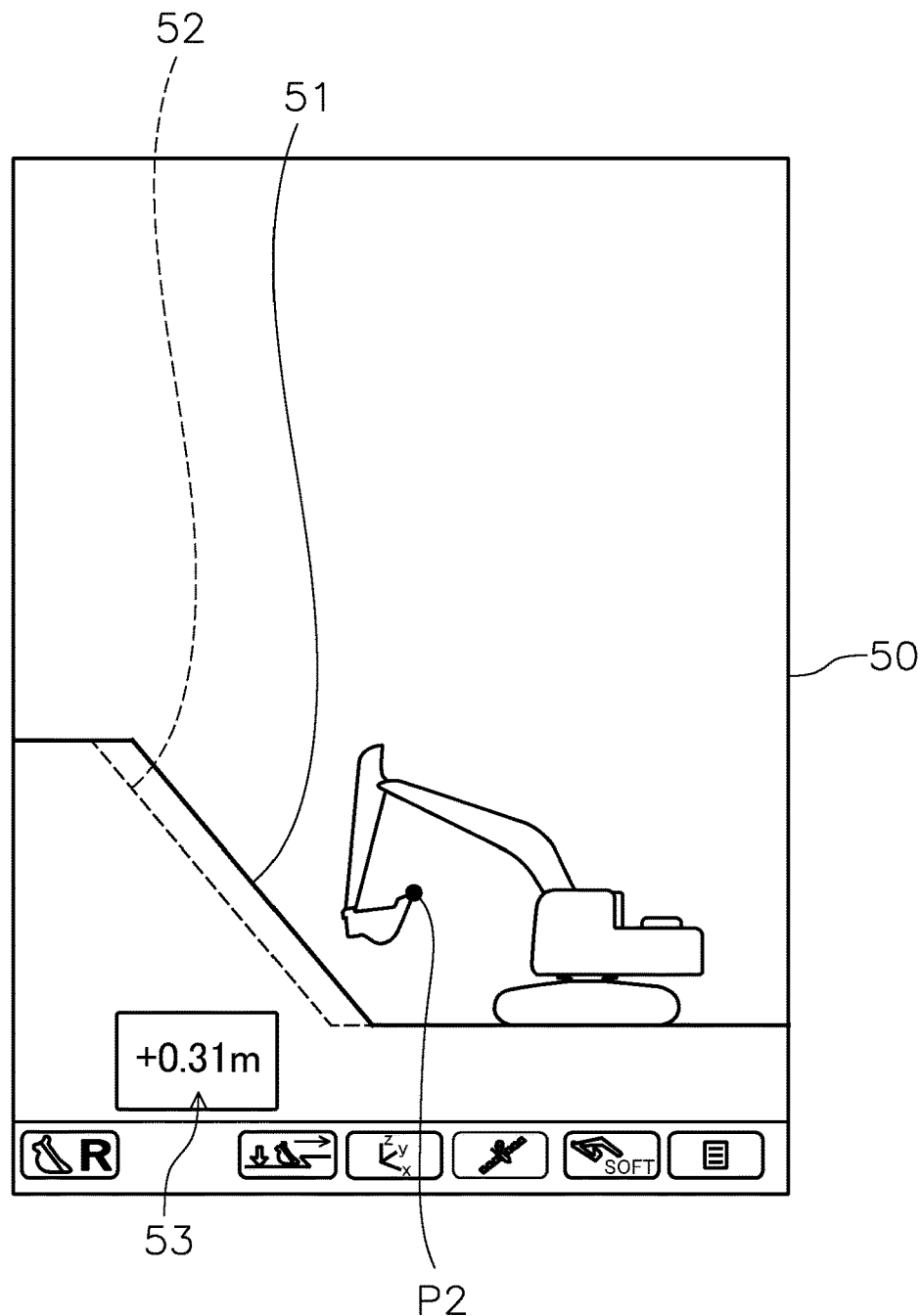
FIG. 4 illustrates an example of a guide image.

As described above, the computer 24 calculates the position of the predetermined portion P2 from the reference position P1 detected by the positional sensor 36. As illustrated in FIG. 4, the computer 24 displays a guide image 50 which indicates the calculated position of the predetermined portion P2 on the display 35. For example, the guide image 50 includes a display including a current topography 51 and the predetermined portion P2 of the work machine 1. The storage device 32 saves actual topography data indicative of the position of the current topography 51 in the external coordinate system. The computer 24 calculates the positional relationship between the current topography 51 and the predetermined portion P2 in the external coordinate system, and generates display signals which represent the guide image 50.

The guide image 50 may include a display indicating a target topography 52 and the predetermined portion P2 of the work machine 1. The storage device 32 may save target topography data indicative of the position of the target topography 52 in the external coordinate system. The computer 24 may also calculate the distance between the actual topography 51 and the predetermined portion P2. The guide image 50 may also include a display 53 which indicates said distance. The display 53 indicating the distance may include the distance between the target topography 52 and the predetermined portion P2.

Figure 5:
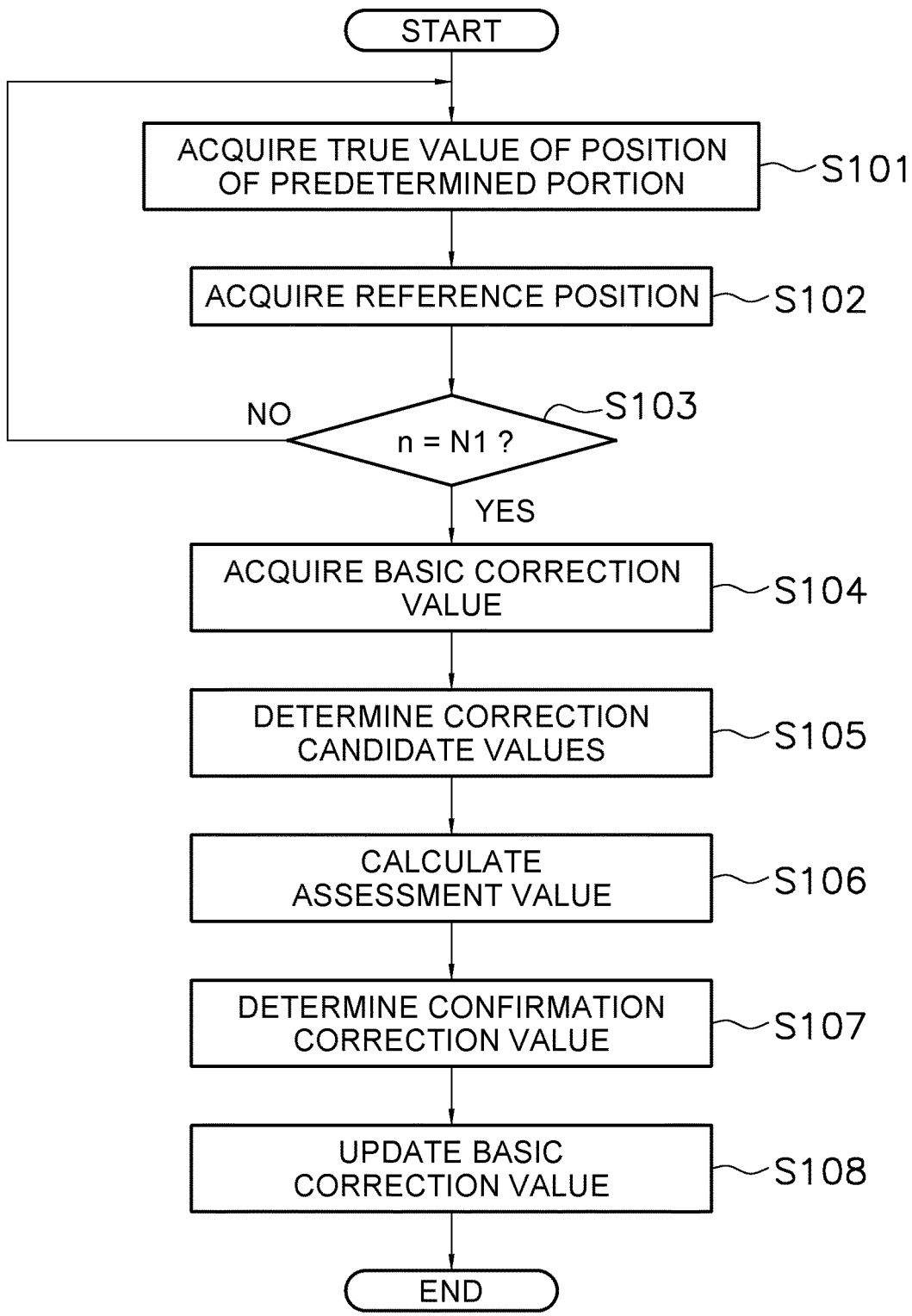
FIG. 5 is a flow chart illustrating processing for calibrating the parameters.

Next, processing for calibrating parameters to be used for calculating the position of the predetermined portion P2 will be explained. FIG. 5 is a flow chart illustrating processing for calibrating the parameters. The parameters to be calibrated are the above-mentioned first position data and the second position data, or any one thereof.

Figure 6:
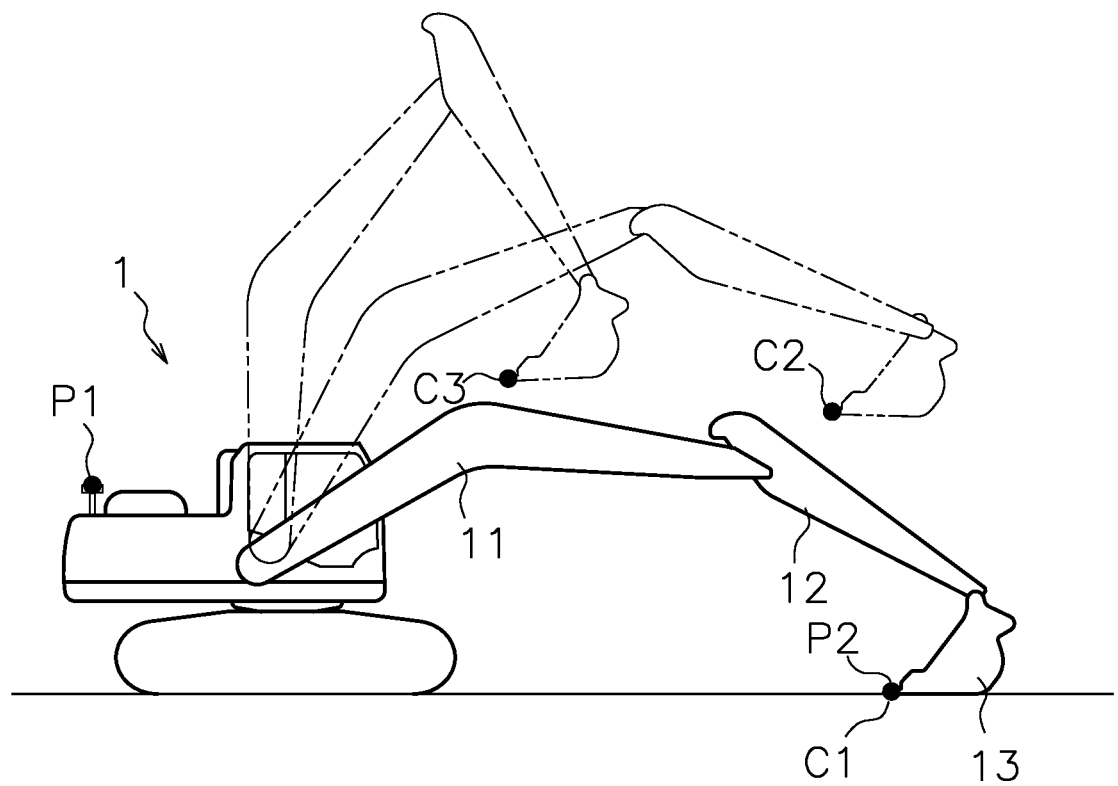
FIG. 6 illustrates an example of work during the calibration.

In step S101, the computer 24 acquires the true value of the position of the predetermined portion. As illustrated in FIG. 6, the operator operates the work machine 1 and places the predetermined portion P2 at a position C1. The position of the position C1 of the predetermined portion in the external coordinate system is measured beforehand and saved in the storage device 32. Alternatively, the position of the position C1 of the predetermined portion in the external coordinate system may be inputted by the operator.

In step S102, the computer 24 acquires the reference position P1 while the predetermined portion P2 is placed at the position C1. The computer 24 acquires the position of the reference position P1 in the external coordinate system from the external coordinate data from the positional sensor 36.

In step S103, the computer 24 determines whether a repeated number n of the acquisitions of the true value of the position of the predetermined portion and the reference position P1 have reached a threshold N1. For example, as illustrated in FIG. 6, the computer 24 acquires the true values and the reference position P1 for a plurality of positions C1 to C3 of the predetermined portion which are different from each other. In the example illustrated in FIG. 6, the plurality of positions C1 to C3 of the predetermined portion include a first position C1, a second position C2, and a third position C3. Accordingly, the number of the plurality of the positions C1 to C3 of the predetermined portion, that is, the threshold N1, is three. However, the number of the plurality of the positions C1 to C3 of the predetermined portion may be less than three or greater than three. When the repeated number n reaches the threshold N1, the processing advances to step S104.

In step S104, the computer 24 acquires a basic correction value of the parameters. As indicated by the following equation (1), the computer 24 uses the reference position P1 acquired in step S102, the correction values of the parameters acquired in step S104, and the above-mentioned parameters to calculate calculation values A1 to A3 of the first to third positions C1 to C3.

$$\begin{cases} Q_1 \cong A_1 = f(x + \Delta x_0) \\ Q_2 \cong A_2 = f(x + \Delta x_0) \\ Q_3 \cong A_3 = f(x + \Delta x_0) \end{cases} \quad (1)$$

Q1 to Q3 are the true values of the first to third positions. A1 to A3 are the calculation values of the first to third positions. The variable x is one value among the plurality of parameters. The variable $\Delta x0$ is the basic correction value of each parameter. The computer 24 calculates the correction values A1 to A3 of the first to third positions C1 to C3 of the predetermined portion so that the correction values A1 to A3 of the first to third positions C1 to C3 match the true values Q1 to Q3 for all of the plurality of parameters or for a portion thereof.

If a below-mentioned confirmation correction value is stored in the storage device 32 as result of a previous calibration, the computer 24 may acquire the stored confirmation correction value as the basic correction value. If no confirmation correction value is stored, the computer 24 may acquire a predetermined value such as zero as the basic correction value. Alternatively, the computer 24 may acquire a value inputted by the operator with the input device 34 as the basic correction value.

In step S105, the computer 24 determines correction candidate values. The correction candidate values are determined in the vicinity of the basic correction value $\Delta x0$. For example, the correction candidate values include the value of a displaced basic correction value $\Delta x0$ and the basic correction value $\Delta x0$. For example, the correction candidate values include values of the displaced basic correction value $\Delta x0$ increased by a predetermined ratio. The correction candidate values include values of the displaced basic correction value $\Delta x0$ reduced by a predetermined ratio. For example, the correction candidate values include correction values $\Delta x1$ and $\Delta x1$ in addition to the basic correction value $\Delta x0$.

$$\begin{cases} \Delta x_1 = (1 + a)\Delta x_0 \\ \Delta x_2 = (1 - a)\Delta x_0 \end{cases} \quad (2)$$

The predetermined ratio a in equation (2) is, for example, 0.1. However, the predetermined ratio a may be a value other than 0.1.

The correction candidate values may be in the vicinity of the basic correction value $\Delta x0$ in the three-dimensional coordinates (x, y, z). The amount of displacement is not limited to the predetermined ratio and different displacement amounts may be applied to each of the axes of the three-dimensional coordinates (x, y, z). For example, the X direction may be displaced by ±0.1, the Y direction may be displaced by ±0.1, the Z direction may be displaced by ±0.05. Alternatively, the X direction may be displaced by ±0.1, the Y direction may be displaced by ±0.1, the Z direction may be displaced by ±0.

In step S106, the computer 24 calculates an assessment value. The assessment value represents the magnitude of the tolerance between the true value and the calculation value of the position of the predetermined portion. Specifically, the computer 24 calculates the assessment value E using the following equation (3).

$$E = \frac{\alpha (Q_1 - A_1) + \beta(Q_2 - A_2) + \gamma(Q_3 - A_3)}{\alpha + \beta + \gamma} \quad (3)$$

In the equation (3), $\alpha$, $\beta$, and $\gamma$ are weighting coefficients. However, the weighting coefficients $\alpha$, $\beta$, and $\gamma$ may be omitted. In such a case, the number of samples may be inserted in place of the weighting coefficients $\alpha$, $\beta$, and $\gamma$ in the equation (3). Alternatively, the weighting coefficient of an attitude that is considered important among the weighting coefficients $\alpha$, $\beta$, and $\gamma$ may be increased.

The computer 24 uses the equation (3) to calculate respective assessment values E0, E1, and E2 of the correction candidate values $\Delta X0$, $\Delta X1$, and $\Delta X2$. The number of the correction candidate values is not limited to three and there may be three or more or less than three.

In step S107, the computer 24 determines the confirmation correction value. The computer 24 determines the confirmation correction value based on the assessment values E0, E1, and E2. Specifically, the computer 24 determines the smallest correction candidate value among the correction candidate values E0, E1 and E2 as the confirmation correction value. For example, if the assessment value E1 is the smallest, the computer 24 selects the correction candidate value $\Delta X1$ as the confirmation correction value.

In step S108, the computer 24 updates the basic correction value $\Delta x0$. The computer 24 replaces the basic correction value $\Delta x0$ with the confirmation correction value determined in step S107 thereby updating the basic correction value $\Delta x0$. The updated basic correction value $\Delta x0$ is saved in the storage device 32. When the next calibration is performed, the computer 24 executes the above-mentioned processing from step S101 to step S108 using the updated basic correction value $\Delta x0$. The computer 24 executes the above-mentioned processing on all of the parameters or on a portion of the parameters, thereby determining the basic correction value $\Delta x0$ for each parameter.

According to the control system as in the present embodiment explained above, the assessment values are calculated for the plurality of correction candidate values that have been determined from the basic correction value $\Delta x0$. The confirmation correction values of the parameters are determined from the assessment values. As a result, the accuracy of the calibration of the parameter is improved. Consequently, the accuracy of position detection is improved. The confirmation correction values may also be updated by repeating the above processing.

a. Although an embodiment of the present invention has been described so far, the present invention is not limited to the above embodiment and various modifications may be made within the scope of the invention.

The work machine 1 is not limited to a hydraulic excavator and may be another work machine, such as a wheel loader, a bulldozer, a motor grader, or the like. The configuration of the work machine 1 is not limited to the above-mentioned configuration and may be changed.

The computer 24 may include a plurality of processors. The afore-mentioned processing may be distributed among the plurality of processors and executed. The computer is not limited to one and the processing may be distributed among a plurality of computers and executed. For example, FIG. 7 is a block diagram of a configuration of the control system according to another embodiment.

Figure 7:
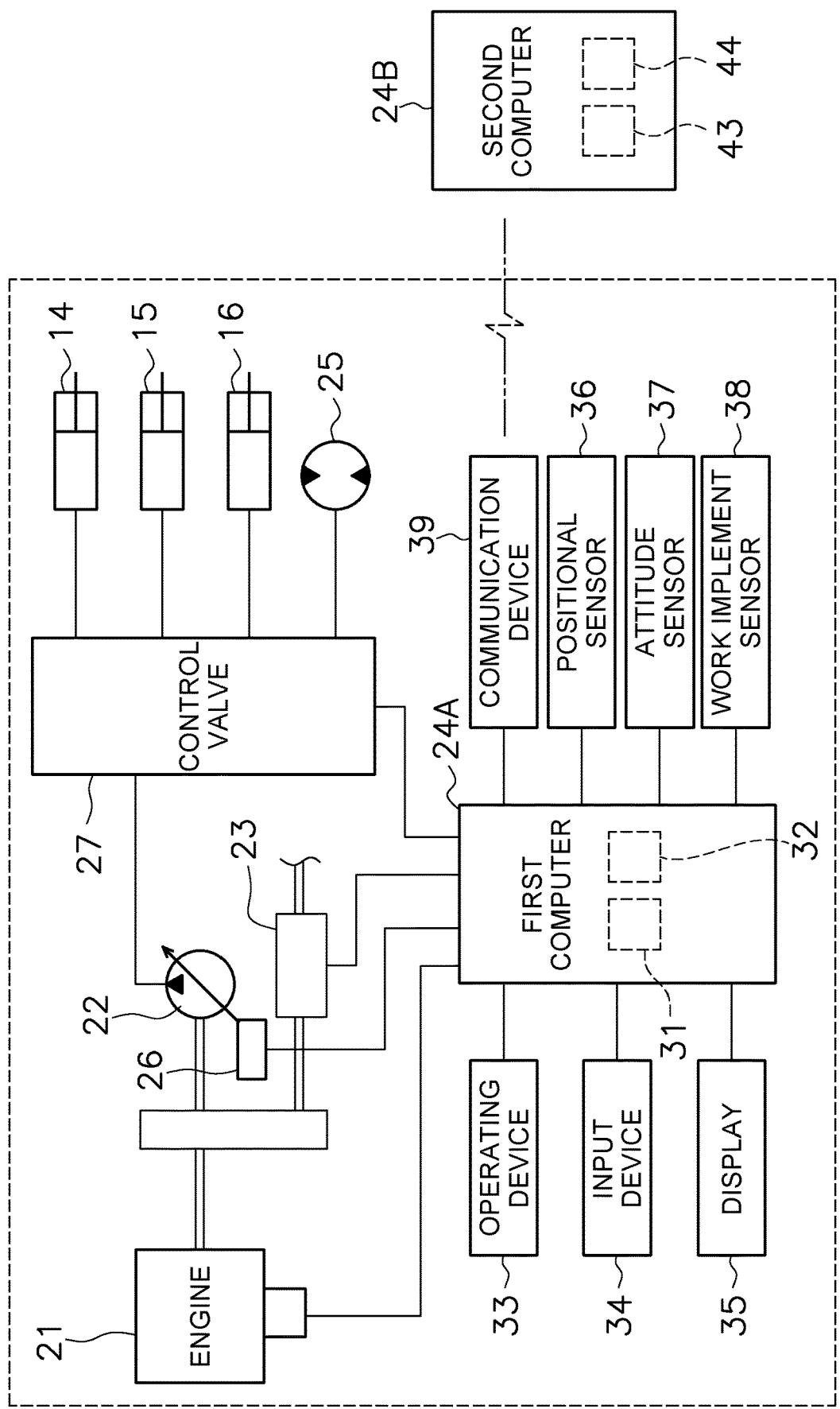
FIG. 7 is a block diagram of a configuration of the control system according to another embodiment.

As illustrated in FIG. 7, the system includes a first computer 24A and a second computer 24B. The first computer 24A has the same configuration as the computer 24 in the above-mentioned embodiment. The work machine 1 includes a communication device 39. The first computer 24A communicates with the second computer 24B via the communication device 39. The second computer 24B is disposed outside of the work machine 1. The second computer 24B may be disposed in a management center separated from the work site where the work machine 1 is disposed.

The second computer 24B communicates with the first computer 24A via a communication network, such as 4G or 5G mobile communication network, a satellite communication network, a LAN, or the Internet. The second computer 24B may be a server that communicates with a plurality of work machines.

The second computer 24B includes a processor 43 and a storage device 44 in the same way as the first computer 24A. The above-mentioned calibration processing is distributed among the first computer 24A and the second computer 24B and executed. For example, the first computer 24A transmits the true position and the calculation value of the position of the predetermined portion, to the second computer 24B. Moreover, the first computer 24A transmits the above-mentioned parameters to the second computer 24B. The first dimension data and the second dimension data may be saved beforehand in the storage device 44 of the second computer 24B.

The second computer 24B executes the processing from step S104 to step S108. The second computer 24B transmits the updated basic correction value Δx0 to the first computer 24A. The first computer 24A saves the updated basic correction value Δx0 in the storage device 32. The first computer 24A calculates the position of the predetermined portion P2 from the reference position P1 based on the updated basic correction value Δx0.

The processing for calculating the position of the predetermined portion P2 from the reference position P1 is not limited to the above-mentioned embodiment, and may be changed, omitted, or processing may be added thereto. The parameters are not limited to the above embodiment and may be changed, omitted, or other parameters may be added. For example, the parameters may include the hydraulic pressure of the hydraulic fluid, or the weight or the position of the center of gravity of the work machine. The parameters may include the weight and dimensions of the travel device (for example, crawler belts or tires).

In order to facilitate the explanation of the above embodiment, the explanation of the positions in the left-right direction of the work machine 1 was omitted. However, the computer 24 may calculate the position of the predetermined portion P2 from the reference position P1 based on parameters relating to the positions in the left-right direction of the work machine 1. The first attitude data of the main body 2 may include the roll angle of the main body 2. The roll angle of the main body 2 is the inclination angle in the left-right direction of the main body 2 with respect to the horizontal direction. The first dimension data may include the position in the left-right direction of the reference position P1 of the main body 2. The second dimension data may include the position in the left-right direction of the predetermined portion P2 in the work implement 3.

In the above embodiment, the guide image 50 is displayed on the display 35 using the calculated position of the predetermined portion P2. However, the computer 24 may use the calculated position of the predetermined portion P2 when executing processing different from the above embodiment. For example, the computer 24 may use the calculated position of the predetermined portion P2 to automatically control the work implement 3. The computer 24 may automatically control the work implement 3 so that the predetermined portion P2 moves along the target topography 52 illustrated in FIG. 4.

Figure 8:
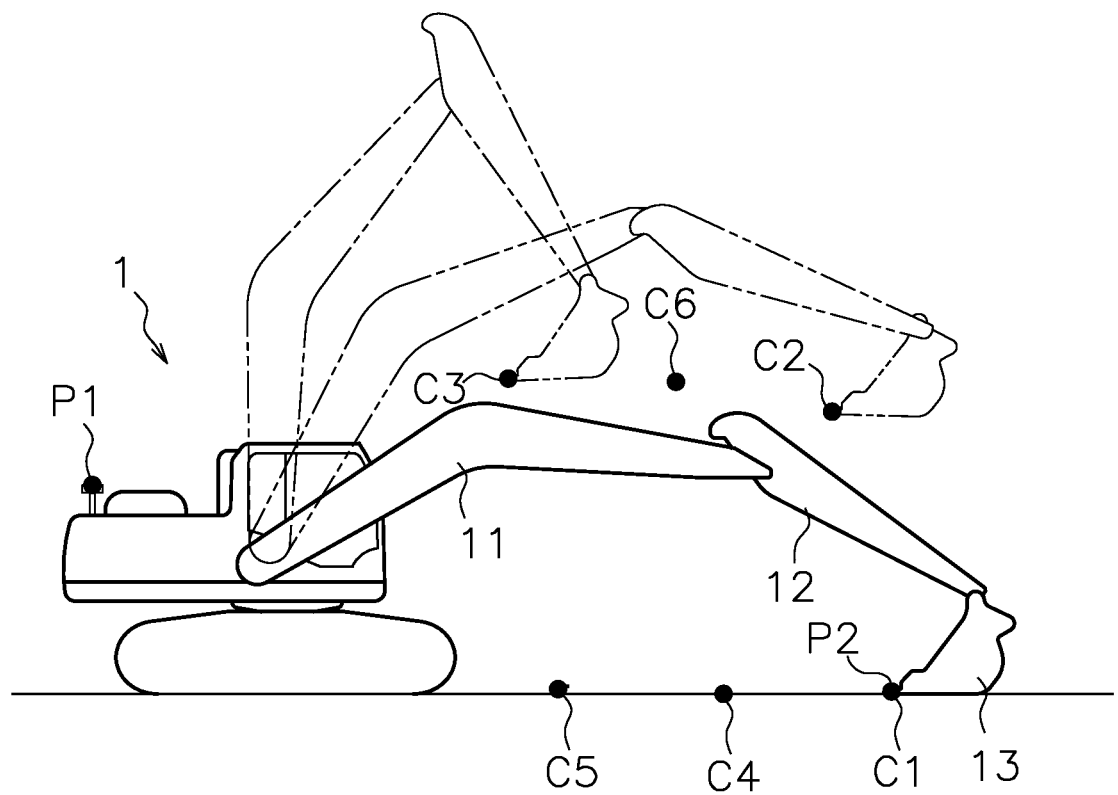
FIG. 8 illustrates another example of work during the calibration.

The computer 24 may output an alert signal to the display 35 when the position of the predetermined portion during the current calibration and the position of the predetermined portion during the previous calibration are the same. The alert signal may include an alert display for recommending another position to be selected as the position of the predetermined portion. For example, as illustrated in FIG. 8, when the operator has selected the first to third positions C1 to C3 during the current calibration that were also selected during the previous calibration, the computer 24 may output the alert signal so as to select other positions C4 to C6. Alternatively, the computer 24 may output the alert signal when positions C4 to C6 of the predetermined portion which are not in the vicinity of the first to third positions C1 to C3 selected in the previous calibration, are selected during the current calibration.

According to the present disclosure, the accuracy of position detection in a work machine can be improved.

The invention claimed is:

1. A method executed by a computer, in a work machine including a predetermined portion, for calibrating a parameter to be used in calculating a position of the predetermined portion from a reference position in the work machine, the method comprising:
    acquiring a true value of the position of the predetermined portion;
    acquiring the reference position;
    determining a plurality of correction candidate values of the parameter, the correction candidate values being used so that a calculation value of the position of the predetermined portion calculated based on the parameter from the reference position matches the true value;
    calculating, for each of the plurality of correction candidate values, an assessment value indicative of a difference between the true value and the calculation value; and
    determining a confirmation correction value of the parameter from among the plurality of correction candidate values based on the assessment value,
    the plurality of correction candidate values including
        a basic candidate value to be used so that the calculation value of the position of the predetermined portion calculated based on the parameter from the reference position matches the true value; and
        a correction value determined in a vicinity of the basic correction value, the correction value determined in the vicinity of the basic correction value being a value in which the basic correction value is displaced by increasing or decreasing the basic correction value by a predetermined ratio or a predetermined amount.

2. The method according to claim 1, further comprising:
    calculating the assessment value based on a plurality of differences between a plurality of the true values and a plurality of the calculation values of the position of the predetermined portion.

3. A method executed by a computer, in a work machine including a predetermined portion, for calibrating a parameter to be used in calculating a position of the predetermined portion from a reference position in the work machine, the method comprising:
- acquiring a true value of the position of the predetermined portion;
- acquiring the reference position;
- determining a plurality of correction candidate values of the parameter, the correction candidate values being used so that a calculation value of the position of the predetermined portion calculated based on the parameter from the reference position matches the true value;
- calculating, for each of the plurality of correction candidate values, an assessment value indicative of a difference between the true value and the calculation value;
- calculating the assessment value based on a plurality of differences between a plurality of the true values and a plurality of the calculation values of the position of the predetermined portion, and multiplying each of the plurality of differences by a weighting coefficient; and
- determining a confirmation correction value of the parameter from among the plurality of correction candidate values based on the assessment value.

4. The method according to claim 1, further comprising
- determining the plurality of correction candidate values using the confirmation correction value as the basic correction value; and
- updating the confirmation correction value by repeatedly calculating the assessment value.

5. The method according to claim 1, wherein the work machine includes
- a main body including the reference position, and
- a work implement that includes the predetermined portion, the work implement being movably attached to the main body.

6. The method according to claim 5, wherein the parameter includes first position data indicative of the reference position in the main body.

7. The method according to claim 5, wherein the parameter includes second position data indicative of the position of the predetermined portion in the work implement.

8. The method according to claim 1, further comprising
- determining the correction candidate value with the smallest assessment value as the confirmation correction value.

9. A method executed by a computer, in a work machine including a predetermined portion, for calibrating a parameter to be used in calculating a position of the predetermined portion from a reference position in the work machine, the method comprising:
- acquiring a true value of the position of the predetermined portion;
- acquiring the reference position;
- determining a plurality of correction candidate values of the parameter, the correction candidate values being used so that a calculation value of the position of the predetermined portion calculated based on the parameter from the reference position matches the true value;
- calculating, for each of the plurality of correction candidate values, an assessment value indicative of a difference between the true value and the calculation value;
- determining a confirmation correction value of the parameter from among the plurality of correction candidate values based on the assessment value;
- storing the position of the predetermined portion of a previous calibration selected by an operator, and
- outputting an alert signal for recommending another position to be selected as the position of the predetermined portion upon determining that the position of the predetermined portion selected by the operator during a current calibration and the position of the predetermined portion selected by the operator during the previous calibration are the same.

10. A system comprising:
- a work machine including a predetermined portion;
- a positional sensor that detects a reference position in the work machine; and
- a computer configured to calibrate a parameter to be used for calculating the position of the predetermined portion from the reference position, the computer being configured to
  - acquire a true value of the position of the predetermined portion,
  - acquire the reference position detected by the positional sensor,
  - determine a plurality of correction candidate values of the parameter, the correction candidate values being used so that a calculation value of the position of the predetermined portion calculated based on the parameter from the reference position matches the true value,
  - calculate, for each of the plurality of correction candidate values, an assessment value indicative of a difference between the true value and the calculation value, and
  - determine a confirmation correction value of the parameter from among the plurality of correction candidate values based on the assessment value,
- the plurality of correction candidate values including
  - a basic correction value to be used so that the calculation value of the position of the predetermined portion calculated based on the parameter from the reference position matches the true value, and
  - a correction value determined in a vicinity of the basic correction value, the correction value determined in the vicinity of the basic correction value being a value in which the basic correction value is displaced by increasing or decreasing the basic correction value by a predetermined amount or a predetermined ratio.

11. The system according to claim 10, wherein the computer is configured to calculate the assessment value based on a plurality of differences between a plurality of the true values and a plurality of the calculation values of the position of the predetermined portion.

12. A system comprising:
- a work machine including a predetermined portion;
- a positional sensor that detects a reference position in the work machine; and
- a computer configured to calibrate a parameter to be used for calculating the position of the predetermined portion from the reference position, the computer being configured to
  - acquire a true value of the position of the predetermined portion,
  - acquire the reference position detected by the positional sensor,
  - determine a plurality of correction candidate values of the parameter, the correction candidate values being used so that a calculation value of the position of the predetermined portion calculated based on the parameter from the reference position matches the true value, calculate, for each of the plurality of correction candidate values, an assessment value indicative of a difference between the true value and the calculation value, the computer being configured to calculate the assessment value based on a plurality of differences between a plurality of the true values and a plurality of the calculation values of the position of the predetermined portion, and multiplying each of the plurality of differences by a weighting coefficient, and determine a confirmation correction value of the parameter from among the plurality of correction candidate values based on the assessment value.

13. The system according to claim 10, wherein
the computer is configured to
determine the plurality of correction candidate values using the confirmation correction value as the basic correction value, and
update the confirmation correction value by repeatedly calculating the assessment value.

14. The system according to claim 10, wherein
the work machine includes
a main body including the reference position, and
a work implement including the predetermined portion, the work implement being movably attached to the main body.

15. The system according to claim 14, wherein
the parameter includes first position data indicative of the reference position in the main body.

16. The system according to claim 14, wherein
the parameter includes second position data indicative of the position of the predetermined portion in the work implement.

17. The system according to claim 10, wherein
the computer is configured to determine the correction candidate value with the smallest assessment value as the confirmation correction value.

18. A system comprising:
a work machine including a predetermined portion;
a positional sensor that detects a reference position in the work machine; and
a computer configured to calibrate a parameter to be used for calculating the position of the predetermined portion from the reference position, the computer being configured to
acquire a true value of the position of the predetermined portion,
acquire the reference position detected by the positional sensor,
determine a plurality of correction candidate values of the parameter, the correction candidate values being used so that a calculation value of the position of the predetermined portion calculated based on the parameter from the reference position matches the true value,
calculate, for each of the plurality of correction candidate values, an assessment value indicative of a difference between the true value and the calculation value, and
determine a confirmation correction value of the parameter from among the plurality of correction candidate values based on the assessment value
the computer being configured to
store the position of the predetermined portion of a previous calibration selected by the operator, and
output an alert signal for recommending another position to be selected as the position of the predetermined portion upon determining that the position of the predetermined portion selected by the operator during a current calibration and the position of the predetermined portion selected by the operator during a previous calibration are the same.

* * * * *